3,092,599
COMPOSITION OF CHLOROETHYLENIC POLYMER LATEX WITH A CHLORATE AND OSMIUM TETROXIDE
Harold G. Hahn, Midland, Mich., assignor to The Dow Chemical Company, Midland, Mich., a corporation of Delaware
No Drawing. Filed May 9, 1960, Ser. No. 27,510
11 Claims. (Cl. 260—29.6)

This invention concerns improvements in polymer latex compositions and, more particularly, concerns the stability of chloroethylenic polymer latexes during ageing.

Chloroethylenic polymer latexes suffer a loss of HCl as a function of age which process is considerably accelerated as the temperature is raised above normal. This degradation yields dark colored composition products which causes initially white latexes to darken to yellow, orange, tan, and brown hues. This property has resulted not only in a loss of desirable physical properties of the latexes but has limited their usefulness where clearness or matching of colors is important.

In United States Patent No. 2,643,988 Walter suggests intimately dispersing within such a polymer about 0.01–2.5 percent of a metal salt of an oxygen acid of chlorine; for example, sodium chlorate. We have found, however, that although such stabilizers, particularly if they are water soluble chlorates, do improve the stability of chloroethylenic polymer latexes, the improvement is not sufficient for many of the uses to which such polymers are put.

It is therefore an object of this invention to improve the thermal stability of chloroethylenic polymer latexes and the stability of such latexes during ageing or storage.

The foregoing and related objects can be obtained in a stabilized composition of a chloroethylenic polymer latex containing minor proportions of a water soluble chlorate and osmium tetroxide.

The unstable polymeric material adapted to be used in the compositions of the invention comprises any chloroethylenic polymer. This includes, in particular, homopolymers of vinyl chloride as well as copolymers and other interpolymers of vinyl chloride and/or vinylidene chloride with other ethylenic unsaturated comonomers such as vinyl acetate; acrylonitrile; vinyl propionate; the alkyl, cycloalkyl, and aryl acrylates; and the like. The polymeric material also includes blends of a chloroethylenic polymer or copolymer with a non-chlorine containing polymer or copolymer. Degradation of relatively small proportions of chloroethylenic polymers can affect significantly relatively large proportions of other polymers associated therewith.

As indicated above the composition of the invention includes a minor proportion of a water soluble chlorate, as suggested in the prior art cited. Among the water soluble chlorates we prefer the alkali metal chlorates, particularly sodium chlorate and potassium chlorate. Up to about 3 percent of a water soluble chlorate is sufficient to obtain the full advantages of the invention.

We have found that a minor proportion of osmium tetroxide, together with the water soluble chlorate, adds significantly to the thermal stability of the chloroethylenic polymers. Up to about 350 parts per million osmium tetroxide is sufficient to obtain the full advantage of the invention and about 5 parts per million can give significant advantage.

The chlorate and the osmium tetroxide can be added to the composition prior to polymerization or, alternatively, portions can be added prior to polymerization and further portions can be added subsequently to the dispersed latex. For example, 0.75 percent sodium chlorate can be added prior to polymerization and, as a post polymerization additive, 0.5 percent sodium chlorate and 70 parts per million osmium tetroxide can be added.

Example 1

A 50 percent solids copolymer latex, wherein the copolymer consisted of 75 percent vinylidene chloride, 20 percent vinyl chloride, and 5 percent ethyl acrylate, was prepared in the usual manner except that a first portion had no chlorate or sodium tetroxide added, a second portion had 2 percent sodium chlorate added, and a third portion had 2 percent sodium chlorate plus 70 parts per million osmium tetroxide added.

The latexes were aged at 60° C. for two weeks. Periodically they were tested for reflectance of blue light using a magnesium oxide block as a reference reflecting surface. The percentage reflectance as compared to that from the magnesium oxide block was as follows:

|  | No Additive | 2% Sodium Chlorate | 2% Sodium Chlorate plus 70 p.p.m. Osmium tetroxide |
|---|---|---|---|
| Initial | 68.5 | | |
| One Week | 59.7 | 65.5 | 70.0 |
| Two Weeks | 57.0 | 64.0 | 70.5 |

Example 2

The three polymer latexes prepared according to Example 1 were cast as films and were visually observed over a period of time. The third sample, that containing 2 percent sodium chlorate plus 70 parts per million osmium tetroxide, had significantly better color stability at both room and elevated temperatures.

The above examples were repeated using latexes formed from polymers of vinyl chloride and vinylidene chloride as well as copolymers of these materials with vinyl propionate, vinyl acetate, acrylonitrile, alkyl acrylates, cycloalkyl acrylates, and aryl acrylates. The examples were also repeated using a variety of combinations of water soluble chlorates with various percentages of osmium tetroxide. Results comparable with those reported in the examples above were obtained.

I claim:

1. A stabilized composition of a chloroethylenic polymer latex; said polymer being selected from the class consisting of vinyl chloride homo polymers, vinylidene chloride homo polymers, and copolymers of vinyl chloride and vinylidene chloride with each other and with other polymerizable compounds; and said composition containing minor proportions of a water soluble alkali metal chlorate and osmium tetroxide.

2. The composition according to claim 1 wherein the polymer is a copolymer of vinyl chloride and vinylidene chloride.

3. The composition according to claim 1 wherein the polymer is a copolymer of vinyl chloride and vinyl propionate.

4. The composition according to claim 1 wherein the polymer is a copolymer of vinyl chloride and vinyl acetate.

5. The composition according to claim 1 wherein the polymer is a copolymer of vinyl chloride and an alkyl acrylate.

6. The composition according to claim 1 wherein the polymer is a copolymer of vinyl chloride and an aryl acrylate.

7. The composition according to claim 1 wherein the water soluble chlorate is sodium chlorate.

8. The composition according to claim 1 wherein the water soluble chlorate is potassium chlorate.

9. A stabilized composition of a chloroethylenic polymer latex; said polymer being selected from the class consisting of vinyl chloride homo polymers, vinylidene chloride homo polymers, and copolymers of vinyl chloride and vinylidene chloride with each other and with other polymerizable compounds; and said composition containing up to about 3 percent of a water soluble alkali metal chlorate and from about 5 parts per million to about 350 parts per million osmium tetroxide.

10. The composition according to claim 9 wherein the chlorate is sodium chlorate.

11. The composition according to claim 9 wherein the chlorate is potassium chlorate.

References Cited in the file of this patent

UNITED STATES PATENTS

| | | |
|---|---|---|
| 2,451,180 | Stewart | Oct. 12, 1948 |
| 2,643,988 | Walter | June 30, 1953 |
| 2,818,407 | Aldrich | Dec. 31, 1957 |